Aug. 17, 1965   H. LINDEMANN   3,200,678
METHOD AND APPARATUS FOR SCALPING ROD-SHAPED MATERIALS
Filed Feb. 25, 1963   2 Sheets-Sheet 1

INVENTOR
HANS LINDEMANN
BY: *Dicke and Craig*
ATTORNEYS

INVENTOR
HANS LINDEMANN
BY: Dicke and Craig
ATTORNEYS

United States Patent Office 3,200,678
Patented Aug. 17, 1965

3,200,678
METHOD AND APPARATUS FOR SCALPING ROD-SHAPED MATERIALS
Hans Lindemann, Grossdornberg, Germany, assignor to Th. Calow & Co., Bielefeld, Germany
Filed Feb. 25, 1963, Ser. No. 260,460
Claims priority, application Germany, Feb. 28, 1962, L 41,347
8 Claims. (Cl. 82—1)

The present invention relates to a method of scalping or skimming rod-shaped material, such as wire, rods, bars, pipes, or the like.

In carrying out any of the conventional scalping or skimming processes, the material, the outer surface of which is to be removed, is secured against rotation and fed in its axial direction through a cutter head which, by revolving around the material, carries out the desired cutting operation. The speed of the revolving cutter head and also the speed of feeding the material toward and through the cutter head are preset in accordance with the type of material and are maintained substantially constant during the scalping operation.

Any attempts to carry out a scalping operation at a high cutting speed and at a high cutting output ordinarily result in chattering with all its consequences. This leads not only to chatter marks on the surface of the material, but it also reduces the edge life of the tools. These disadvantages have in the past been overcome to some extent by the employment of suitable guide means which are mounted immediately in front of and behind the cutting tool and it has thus been possible to increase the output rate considerably over that which was previously attainable. When carrying out the scalping operation according to any of the known procedures, it has, however, been impossible even with such guiding means to increase the output beyond certain limits since any attempts to do so either resulted in a breakdown of the cutting tools or the material to be scalped, especially when a material of a small diameter was twisted off because of the high pulsating cutting forces. Although such a twisting or tear of the material may not as yet occur as the result of the actual static load, it is in any event promoted by resonance phenomena which occur during the cutting. The material to be peeled is given bending, rotary or longitudinal vibrations which are due to the fact that the natural frequency of the material approaches the chip breaking frequency which is essentially dependent upon the cutting speed, the cross-sectional size of the chips, and the material to be machined, and further upon the temperature of the material and tools, although this may be controlled to some extent by cooling.

It is an object of the present invention to increase the rate of travel of the material through the scalping machine far beyond any rate which was previously attainable and to avoid entirely any chattering during the scalping operation despite such a high rate of travel and output.

For attaining this object, the invention provides that the rate of feed of the material to be scalped or skimmed, which is normally maintained at a constant value, be varied within relatively short periods of time from the value of zero to a maximum value and back to zero. This may be done in very simple manner, for example, by means of a feeding mechanism in the form of a crank gear in cooperation with clamping jaws which are operative in only one direction of movement. The course of the feeding speed of the material within a certain period of time is then preferably sinusoidal. It starts at zero, increases to a maximum value, and again drops to zero. If a double crank gear is provided in which the cranks are offset at 180° to each other, the interruptions between the periodic feeding movements are only momentary. By experiments it has been found that by applying such periodically and continuously changing feeding movements, it is possible to attain a considerably higher average feeding speed than has been possible when this speed was constant as in the prior scalping processes. It has further been found that the edge life of the cutters in relation to the amount of material cut is considerably longer. Thus, for example, by employing the method according to the invention it has been possible when using hard-metal tools to attain an average rate of feed per revolution of the cutting tool which exceeds the diameter of the material being scalped. Since by the new method of scalping all chattering is avoided, the surface quality of the scalped material is much better than that attainable by the previous scalping processes. This is due to the fact that the continuous change of the feeding speed results in a similar change in the cross-sectional size of the chips and thus also in a continuous change of the chip breaking speed, so that no time remains for the development of resonance phenomena between the chip breaking speed and the material being scalped. In this connection it is also very important that between the individual periodic changes in the cross-sectional size of the chips a short time intervenes in which this size is zero.

Another very important advantage which is attained by the present invention is that the point where the stresses are exerted upon the cutting edge of the scalping tool moves continuously back and forth along this edge. Consequently, the cutting edge is continuously cooled along the chip removal surface and the cutting edge is not merely worn at one point but uniformly along a greater width. If, for example, a very scaly material is scalped according to one of the conventional methods, the cutting edge of the tool is worn especially at one point and therefore requires frequent regrinding. This disadvantage is overcome by carrying out the scalping operation according to the new method with the result that the edge life of the tool will be considerably prolonged.

By proceeding according to the new method, the further advantage is attained that, even though the output of the scalping machine is increased, the costs of its production is reduced as compared with those of the previous machines. Thus, for example, it is possible to utilize the short period in which the feeding movement is interrupted to cut off or straighten the material, for which purpose it is no longer necessary to employ flying shears or complicated straightening machines. Simple shears in a stationary position and a simple straightening press may instead be used. They may be easily controlled so as to be locked during the actual feeding movement of the material and to act only during the short period or periods when the feeding movement is temporarily stopped. In the operation of an apparatus according to the invention, the material to be peeled had, for example, a diameter of 12 mm. of which 1 mm. was to be cut off. The feeding movement was then accelerated sinusoidally for a 25th of a second from zero to a maximum and then decreased to zero, where it was stopped for another 25th of a second whereupon it was again started and sinusoidally accelerated to a maximum and decreased to zero during the next 25th of a second. The short stops between two successive sinusoidal feeding movements may then be used, for example, for straightening the material in a straightening press or cutting it into sections by means of shears which are mounted in a fixed position.

The features and advantages of the present invention will become more clearly apparent from the following detailed description thereof which is to be read with reference to the accompanying drawings, in which:

FIGURE 3 shows a cross section taken along line III—III of FIGURE 4 of an apparatus according to the invention with reciprocating clamping jaws which are adapted to open during the movement in one direction and to close during the movement in the opposite direction; while

Figure 1:
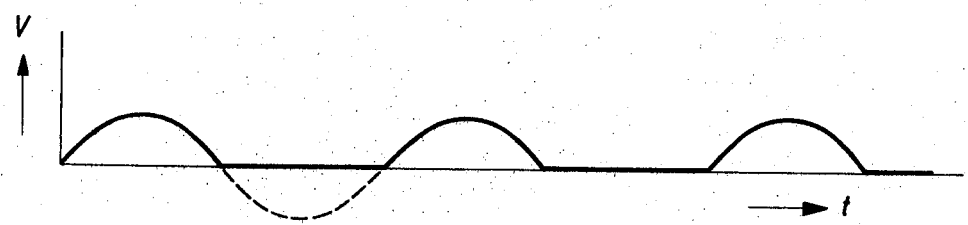
FIGURE 1 shows a diagram of the inventive feeding movement of the material as may be attained, for example, by a crank gear.
Figure 2:
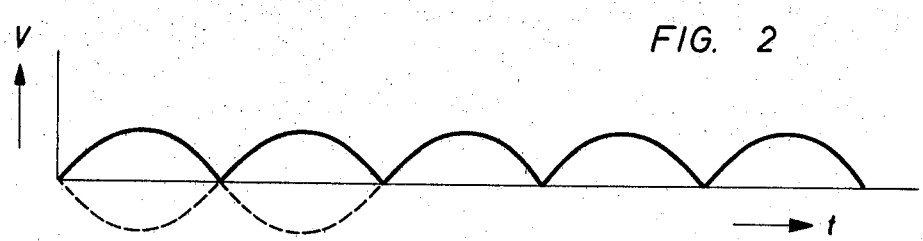
FIGURE 2 shows a diagram of the inventive feeding movement as may be attained, for example, by a double-crank gear in which the two cranks are offset at 180° to each other.
Figure 3:
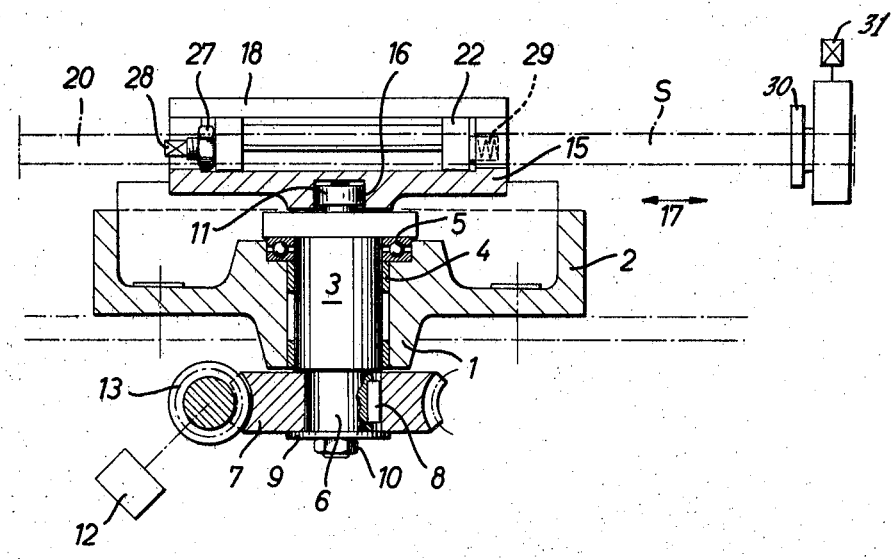
Figure 4:
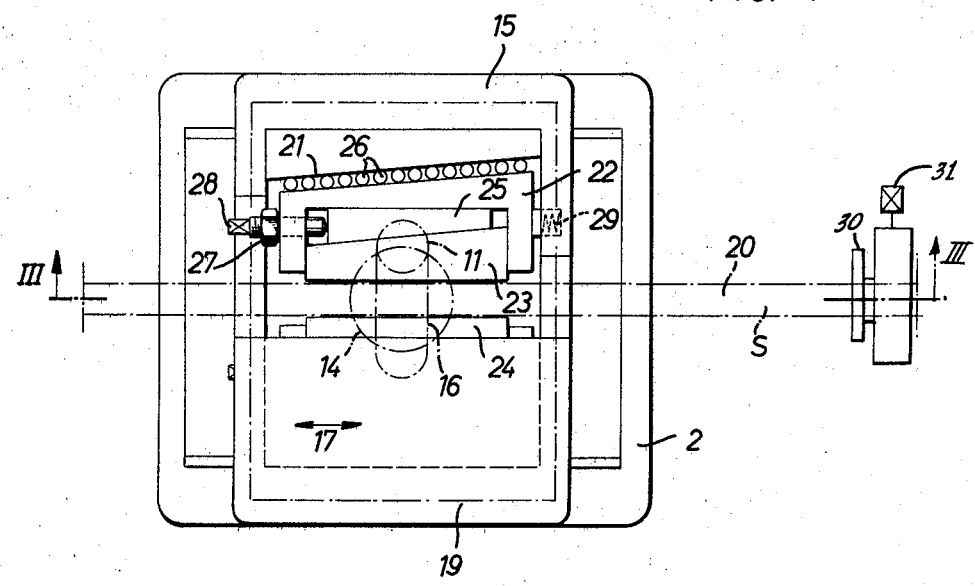
FIGURE 4 shows a plan view of this apparatus from which one of the covers is removed to reveal the inside of the apparatus.

FIGURES 1 and 2 of the drawings illustrate the feeding movement of the material to be scalped in which v indicates the speed and t indicates the time. According to the invention this feeding movement is no longer constant as in previous scalping processes but intermittent, proceeding sinusoidally from zero to a maximum and back to zero, then again to a maximum and back to zero, and so forth. Thus, the feeding movement changes continuously whereby the usual vibrations of the material which occur during the cutting operation in the scalping machine are prevented so that also no chatter marks will occur on the material which were hardly avoidable in the known scalping processes in which the rate of feed was substantially constant, and especially if they were carried out at higher feeding and cutting speeds. If the period of interruption in the feeding movement is to be used for carrying out a certain additional operation on the material, for example, for straightening it in a simple straightening press or cutting it off into sections, this period may be made as long as that of each sinusoidal feeding movement, as illustrated in FIGURE 1. This may be produced, for example, by an apparatus as illustrated in FIGURES 3 and 4 comprising a crank gear, the reciprocating movements of which are transmitted to clamping jaws which exert a clamping action upon the material to be scalped only during their movement in one direction and release the material during their movement in the opposite direction. If, however, each stop between the successive sinusoidal feeding movements should only last for an instant, as illustrated in FIGURE 2, so that each periodic movement starts immediately at the end of the preceding movement, this may be attained, for example, by a double crank gear in which the two cranks are offset at an angle of 180° to each other.

The apparatus according to FIGURES 3 and 4 consists of a box-shaped housing 2 with a hub 1 thereon in which a shaft 3 is mounted on a plain bearing 4 and a ball bearing 5. The reduced lower end 6 of shaft 3 carries a worm gear 7 which is locked thereto by a spline 8, a washer 9 and a nut 10. The upper end of shaft 3 has eccentrically mounted thereon a roller 11 or the like so that, when worm gear 7 is driven by a motor 12 through a worm 13, the axis of roller 11 revolves along a circle 14. Roller 11 engages into a slot 16 in the lower side of a slide carriage 15 so that, since carriage 15 is guided on housing 2 for a rectilinear movement, it will be reciprocated in the direction as indicated by the double arrow 17. Carriage 15 which is provided with a pair of covers 18 and 19 contains symmetrically to the axis 20 of a rod S or the like the surface of which is to be scalped a pair of inclined surfaces 21, a pair of clamping elements 22, a pair of clamping jaws 23 and 24, and a pair of adjusting wedges 25.

Each inclined surface 21 is separated from the adjacent surface of the associated clamping element 22 by a series of rollers 26 for reducing the sliding resistance between these surfaces. Each adjusting wedge 25 is adjustable by a setscrew 28 which may be locked by a nut 27. Each clamping element 22 is acted upon by a spring 29 and guides one of the clamping jaws 23 or 24 so that the latter may be adjusted by wedge 25 in a direction at right angles to the axis 20 of rod S.

When shaft 3 is driven, slide carriage 15 reciprocates in the direction of the double arrow 17. Since the wedges 25 are adjusted by setscrews 28 in accordance with the diameter of rod S, the latter will be gripped by jaws 23 and 24 and moved toward the right during the movement of carriage 15 to the right. When carriage 15 and thus also the inclined surfaces 21 are thereafter moved toward the left, the clamping elements 22 are no longer pressed toward each other, even though the jaws 23 and 24 at first continue to remain in engagement with the rod S. Clamping elements will then also be pressed by spring 29 to the left, whereby jaws 23 and 24 are opened. Jaws 23 and 24 therefore disengage from rod S so that the feeding movement of the latter is interrupted before carriage 15 again moves toward the right and the clamping elements 22 and jaws 23 and 24 again move toward each other and the latter thereby grip the rod S to start the next feeding movement.

The operation of this apparatus therefore results in a sinusoidal feeding movement of the material to be scalped by the cutter head 30 driven by motor 31 as shown in FIGURES 3 and 4.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of scalping material such as wire, rods, pipes, or the like comprising the steps of feeding said material in one direction axially thereof through a revolving cutter head for scalping said material and varying the feeding speed of the material in said one direction during said scalping continuously between zero and a preselected maximum.

2. A method of scalping wire, rods, pipes, or the like comprising the steps of feeding said material in one direction axially thereof through a revolving cutter head for scalping said material and varying the feeding speed in said one direction periodically between zero and a preselected maximum and so that at least the acceleration of said speed from zero to said maximum is substantially sinusoidal.

3. A method of scalping material such as wire, rods, pipes, or the like comprising the steps of imparting a series of progressive feeding movements to said material in one direction axially of said material to cause said material to be fed through a revolving cutter head for scalping said material and varying the feeding speed during each one of said progressive feeding movements between zero and a preselected maximum, and maintaining the feeding speed at zero for a predetermined time between said progressive feeding movements.

4. An apparatus including a scalping head for scalping material such as wire, rods, pipes, or the like comprising clamping means, means for reciprocating said clamping means in a rectilinear movement and means for moving said clamping means into clamping engagement with the material to be scalped only during the forward movement of said clamping means and for releasing said material during the reverse movement of said clamping means.

5. An apparatus including a scalping head for scalping material such as wire, rods, pipes, or the like comprising clamping means, means for periodically moving said clamping means at least in one direction in a substantially sinusoidal time-speed pattern and for then reversing the movement of said clamping means, and means for moving said clamping means into clamping engagement with the material to be scalped only during the movement in said one direction and for releasing said material during the reverse movement of said clamping means.

6. An apparatus including a scalping head for scalping material such as wire, rods, pipes, or the like comprising clamping means, means for imparting periodical movements to said clamping means in a first direction and in a reverse direction and for stopping said movements for predetermined intervals between said movements, said movements at least in said first direction being in a substantially sinusoidal time-speed pattern, and means for moving said clamping means into clamping engagement with the material to be scalped only during the movement in said first direction and for releasing said material during the movement in said reverse direction of said clamping means.

7. A method of scalping material such as wire, rods, pipes or the like, comprising the steps of clamping said material and simultaneously imparting a series of intermittent progressive feeding movements to said material solely in one direction of its axis, each of said movements being at a rate varying continuously from zero to a selected maximum, scalping said material while said material is moving in said one direction and unclamping said material at the conclusion of said movement in said one direction and prior to the initiation of the next of said progressive feeding movements.

8. A method according to claim 7, wherein said series of intermittent progressive feeding movements is in a substantially sinusoidal time-speed pattern.

References Cited by the Examiner

UNITED STATES PATENTS

| | | | |
|---|---|---|---|
| 329,105 | 10/85 | Voight | 82—20 X |
| 398,481 | 2/89 | Whitney | 82—20 X |
| 1,109,387 | 9/14 | Banta | 82—20 |
| 1,114,151 | 10/14 | Koontz | 82—20 X |
| 1,482,390 | 2/24 | Eden | 82—20 |
| 2,814,236 | 11/57 | Burgsmuller | 82—20 X |

FOREIGN PATENTS 246,739    8/47    Switzerland.

WILLIAM W. DYER, Jr., *Primary Examiner.*